US005140122A

United States Patent [19]

Mitnikoff

[11] Patent Number: 5,140,122

[45] Date of Patent: Aug. 18, 1992

[54] MANUFACTURING METHOD, SHAPING AND/OR CONNECTION OF A TRESS, AND PRODUCT SO OBTAINED

[76] Inventor: Michel Mitnikoff, 7 bis, Avenue Raspail, 94100 Saint-Maur, France

[21] Appl. No.: 402,188

[22] Filed: Sep. 5, 1989

[30] Foreign Application Priority Data

Sep. 2, 1988 [FR] France ............................ 88 11531

[51] Int. Cl.$^5$ ............................ B23K 11/16

[52] U.S. Cl. ............................ 219/56.1; 219/117.1

[58] Field of Search ............................ 29/56.1, 117.1

[56] References Cited

U.S. PATENT DOCUMENTS 2,906,334 9/1959 Peters ............................ 219/56.1

4,875,618 10/1989 Hasegawa et al. ............................ 219/56.1

4,922,072 5/1990 Topel et al. ............................ 219/56.1

*Primary Examiner*—Marvin M. Lateef

*Attorney, Agent, or Firm*—Lowe, Price, LeBlanc & Becker

[57] ABSTRACT

A stiffened flat zone of joined wire strands is formed by applying a compressive force to the strands via an electrical conductor having a resistance and resistivity substantially greater than those of the strands with electric welding electrodes while welding current is applied in series to the conductor and the strands by the electrodes. The stiffened flat zone is formed where the current and force are applied to the strands, after the strands have been cooled.

23 Claims, 1 Drawing Sheet

Figure 1:
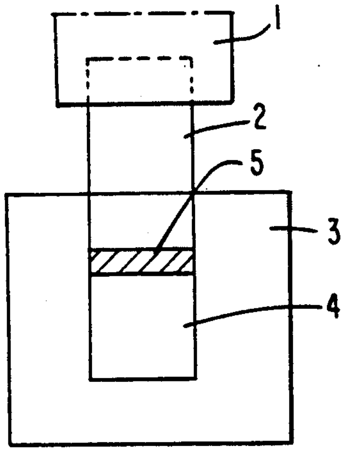

MANUFACTURING METHOD, SHAPING AND/OR CONNECTION OF A TRESS, AND PRODUCT SO OBTAINED

The invention concerns a manufacturing method and the shaping for purposes of connection of a tress on a stiffened flat zone, and further the product so obtained.

The connections of flat cross-sectional tresses into electric circuits as a rule are made by crimping lugs or electrical connectors. This is costly because of the need to resort to expensive components.

Other types of connectors exist. In particular it is known how to fit tubular parts, or crimped metal parts to the tress. This process however incurs the major drawback of enhancing corrosion between the tress surface and the crimped strip.

A different procedure impregnates the tress end by immersion in a molten bath. This entails metal consumption, and furthermore, substantial time is required and hence the procedure is costly.

The object of the present invention is to remedy these drawbacks and to offer in this regard a simple design that provides rapid manufacture and very low cost for electrically and mechanically connecting flexible metal conductors together such a connection is herein called a "tress". Obviously other kinds of conductors may be used, for instance cables with stands of metal wires. For the sake of convenience, all flexible conductors are herein definded as "tresses".

The method of the invention is characterized in that using additional electrical resistors the electrodes of electric welders or pressure welders are equipped so that:

(a) at least one zone of the flexible conductor is compressed, (b) at least one zone of the conductor is heated until the conductor is locally melted, (c) the heated part is let or made to cool so as to solidify, i.e. to stiffen the zone(s).

In this manner at least one flattened zone stiffens. Preferably these zones are located at the end(s) of the tress. The stiff zones may be perforated as desired, marked by compression or else remain in the state of the desired application. The stiffening is implemented by an electric welding machine or a pressure welder. The stiffened zone(s) at the tress end(s) are simultaneously compressed and punched.

The stiffened zone next is protected against corrosion by being electrolytically coated in an immersion bath, or by an atomized anti-oxidant.

The tress end(s) also may be pressure-preshaped to the desired contour using a conventional press. Then the tress end(s) undergoes the stiffening phase by means of pre-shaped electrodes. These ends also may undergo pre-shaping by means of additional heating resistors contoured into the desired shape and then be stiffened at the end of a compression stage of the tress zones. This procedure avoids additional machining.

Other features and advantages of the present invention shall be elucidated below in relation to the following description of one implementing mode of the invention offered in illustrative but non-limiting manner and shown in the drawings.

Figure 2:
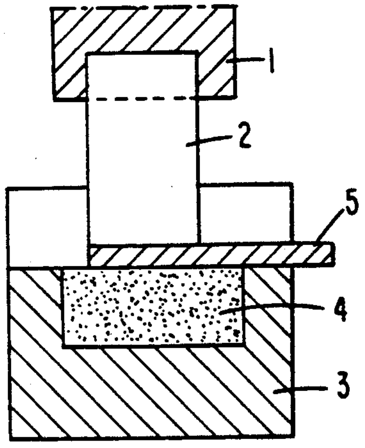
Figure 3:
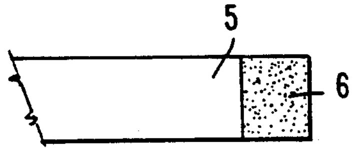
Figure 4:
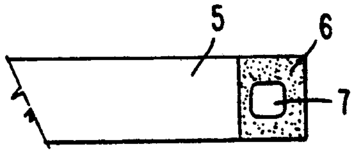
Figure 5:
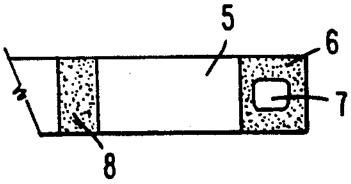
Figure 6:
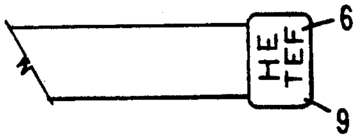
Figure 7:
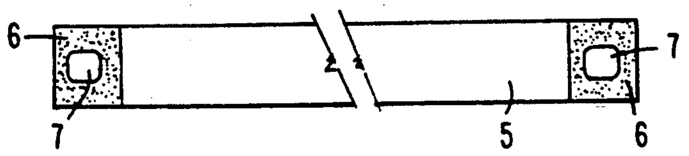

FIG. 1 is a schematically view of a longitudinal section of a welding machine implementing the method of the invention, FIG. 2 is a view similar to FIG. 1 of the assembly at the time of welding, FIG. 3 is a drawing of a tress end after welding, FIG. 4 is a view similar to that of FIG. 3 of the perforated stiffened part, FIG. 5 is a view similar to that of FIG. 4 and of another performated stiffened tress, FIG. 6 is a view of an end of a marked and stiffened tress, FIG. 7 is a view of two ends of a perforated and stiffened tress.

In FIG. 1 is schematically shown the position of the tress 5 relative to electrodes 1 and 3 prior to welding. The movable upper electrode 1 is made of copper and equipped with an additional resistor 2 which can cooperate with the actual resistor of the welding elements. This metallic additional resistor 2 may be made of molybdenum or tungsten or of any high electric resistivity material. The same considerations apply to the stationary copper electrode 3 connected to an additional metal resistor 4 made of a material of high electrical resistivity.

The electric welding machine, the welding press and the welding procedure are not described in detail because they are conventional.

The simultaneity of compressing the end zone surface 6 between additional resistors 2 and 4 and of the high-density current cause fusing of the conductors making up the tress 5 in the compressed zone 6. The stiffening of the zone 6 takes place after it is being cooled. Obviously there is tight dependency between the pressure exerted on the tress, the current density and the length of time of the welding operation. This relation includes several parameters, in particular the cross-section of the tress and its composition (steel, copper, aluminum, alloys and the like). Punched holes 7 may be formed in a conventional manner in stiffened end zone 6. The result is shown illustratively in FIGS. 4, 5 and 6. The stiffened zone 7 also may be marked under pressure as indicated by reference numeral 9, as shown in FIG. 6.

The method of the present invention leads to many applications. In particular electrical connections may be made without adding constituents to the tress ends as was the case described above.

In this manner, grounding means for average voltages (440 kv for instance) may be implemented economically while being of high quality. At least one of the ends of such an electric connection may be provided with a cylindrical shape with anchoring barbs or sprockets. The examples shown in FIGS. 5 and 7 are especially well suited in this respect.

In another application, stiffened zone 8 in the center of the tress-means is able to prevent water from flowing through zone 8.

The invention also applies to manufacturing taps and very particularly to making automobile electrical equipment as antistatic or shielding equipment.

Obviously the present invention is not limited to the above described and shown modes of implementation but covers all implementing variations and/or combinations of their diverse elements.

I claim:

1. A method of mechanically connecting electrically conducting elements to each other to form a stiffened flat zone of the elements comprising applying a compressive force to the elements via an electrical conductor having a resistance and resistivity substantially greater than those of the elements, the force being applied with electric welding electrodes while welding current is applied in series to the conductor and the elements by the electrodes, whereby the stiffened flat zone is formed where the force and current are applied to the elements.

2. The method of claim 1 wherein the force and current are applied to first and second opposite sides of the elements via first and second of said conductors, respectively.

3. The method of claim 2 wherein the first and second conductors have first and second opposite ends positioned so that (a) the first and second opposite ends of the second conductor abut respectively against a second of the electrodes and the second side of the elements and (b) the first and second opposite ends of the first conductor abut respectively against a first of the electrodes and the first side of the elements.

4. The method of claim 3 wherein the elements have longitudinal axes that extend in generally the same direction which is substantially at a right angle to the direction the force and current are applied.

5. The method of claim 4 further including causing the elements to cool.

6. The method of claim 5 wherein the zone is at common ends of the elements.

7. The method of claim 5 wherein the zone is at a portion of the elements removed from both ends of the elements.

8. The method of claim 6 further including causing the elements to cool, and punching the stiffened zone after the elements have cooled.

9. The method of claim 6 further including causing the elements to cool, and embossing the stiffened zone after the elements have cooled.

10. The method of claim 1 wherein the elements have longitudinal axes that extend in generally the same direction which is substantially at a right angle to the direction the force and current are applied.

11. The method of claim 1 further including causing the elements to cool.

12. The method of claim 1 wherein the zone is at common ends of the elements.

13. The method of claim 1 wherein the zone is at a portion of the elements removed from both ends of the elements.

14. The method of claim 1 further including causing the elements to cool, and punching the stiffened zone after the elements have cooled.

15. The method of claim 1 further including causing the elements to cool, and embossing the stiffened zone after the elements have cooled.

16. The method of claim 1 wherein the conductors are strands of metal wire having longitudinal axes that extend in generally the same direction which is substantially at a right angle to the direction the force and current are applied.

17. An assembly of electrically conducting elements mechanically and electrically connected to each other to form a stiffened flat zone of the elements, the assembly being formed by a method comprising applying a compressive force to the elements via an electrical conductor having a resistance and resistivity substantially greater than those of the elements, the force being applied with electric welding electrodes while welding current is applied in series to the conductor and the elements by the electrodes, whereby the stiffened flat zone is formed where the force and current are applied to the elements.

18. The assembly of claim 17 wherein the elements have longitudinal axes that extend in generally the same direction which is substantially at a right angle to the direction the force and current are applied.

19. The assembly of claim 17 wherein the zone is at common ends of the elements.

20. The assembly of claim 17 wherein the zone is at a portion of the elements removed from both ends of the elements.

21. The assembly of claim 17 wherein the zone has an aperture therein.

22. The assembly of claim 17 wherein the zone is embossed.

23. The assembly of claim 17 wherein the conductors in the zone are compressed together sufficiently to prevent liquid from flowing through them.

* * * * *